May 2, 1939.  J. W. L. SIMPSON  2,156,436

OPERATING MECHANISM FOR SOOT BLOWERS

Filed Jan. 14, 1937  2 Sheets—Sheet 1

INVENTOR
J W L SIMPSON
PER Rayner Ho
ATTORNEYS

INVENTOR
J W L SIMPSON
PER Rayner Ho
ATTORNEYS

Patented May 2, 1939

2,156,436

UNITED STATES PATENT OFFICE 2,156,436

OPERATING MECHANISM FOR SOOT BLOWERS

John William Leslie Simpson, Littleover, Derby, England, assignor to Hopkinsons Limited, Huddersfield, England Application January 14, 1937, Serial No. 120,517
In Great Britain January 21, 1936

2 Claims. (Cl. 122—392)

The present invention relates to improved operating mechanism for soot blowers and the like, and one object of this invention is to provide an operating mechanism, for advancing and retracting the blower tube or head, which will be smooth and easy in operation and in which all of the sliding joints and parts of the driving mechanism acting upon the slidable blower tube and the valve mechanism are enclosed to ensure a highly efficient seal against leakage of the pressure fluid. Another object of this invention is to provide an operating mechanism which is particularly suitable for use with a soot blower in which the pressure fluid acts upon a valve in the direction of travel of the blower head so as to assist the outward movement of the blower head but which consequently opposes retraction of the blower head. A still further object of this invention is to provide mechanism for advancing and retracting the blower tube and head which minimises the effort required to overcome friction due to carbonaceous and other deposits in the sliding parts and also enables the mass of the translatively moved blower tube and head parts to be approximately balanced and also guided for sliding by relatively long sleeve like co-operating parts so as to obviate unbalanced distribution of loads or masses, and increased resistance due to the weight of the blower head and associated conduit parts tending to produce misalignment of the co-axial interconnected sliding and operating parts.

In carrying an embodiment of this invention into practice the soot blower comprises a tubular housing, a fixed pressure fluid supply conduit extending into one end of the housing, the housing being sealed at said end against escape of pressure fluid, a sleeve in the housing sealed about and slidable along the supply conduit, a blower tube fixed at its rear end in the front end of said sleeve, driving mechanism within the housing to advance and retract the blower tube and said sleeve, an annular valve seating at the rear end of the blower tube and an opposed annular valve seating at the front end of said supply conduit, and a poppet valve in said conduit and with its head interposed between and adapted to be pressed against said seating when the blower tube is retracted, said driving mechanism comprising a driven gear within the housing and a threaded collar about said sleeve fixed to the blower tube and thrust bearings between the ends of the said sleeve and abutments.

In order that this invention may be clearly understood and readily carried into effect I have appended hereto sheets of drawings illustrating alternative embodiments thereof and wherein.

Figure 1:
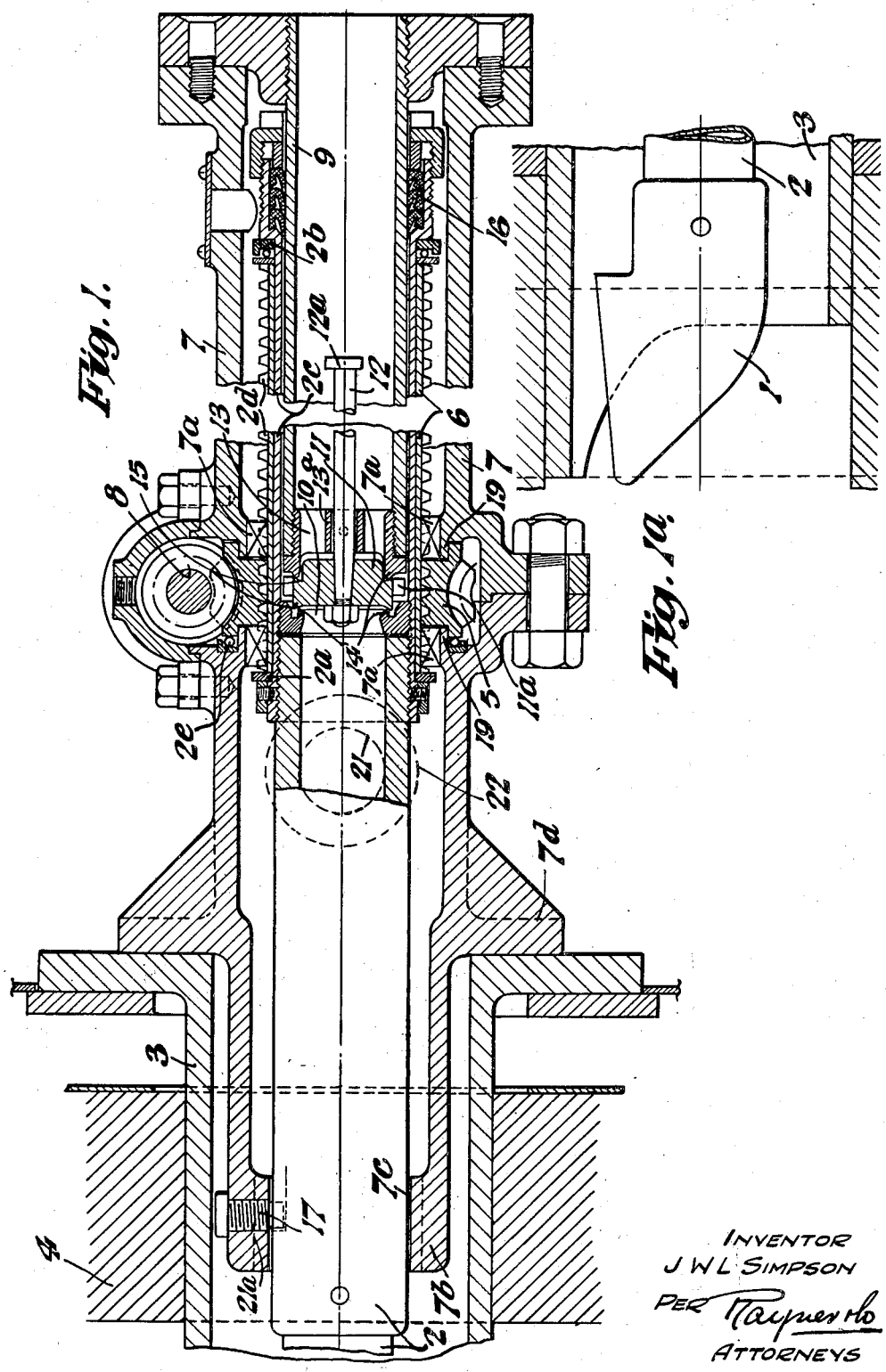
Fig. 1 is a longitudinal section showing worm and nut actuated non-rotatable but slidable threaded sleeve traversing device.

Referring to the drawings the blower head or nozzle 1 is fitted to one end of a blower tube 2 arranged to be projected with an axial movement within a cylindrical chamber 3 in the wall 4 of the boiler shell or other suitable apparatus. The feeding mechanism for effecting this operation is a nut and feed screw form of mechanism so arranged as to enable a reasonable length of blower tube to be slid backwards and forwards with a small amount of effort whilst at the same time leaving the nozzle 1 and tube 2 free to have applied thereto such rotary, part rotary or non-rotary sliding action as may be required to meet the demands of various boilers and other apparatus, without having to alter the feed screw mechanism in predetermining whether or not the blower tube is to rotate.

The feed screw mechanism for achieving this desideratum is preferably so arranged as to obviate unenclosed sliding parts through which steam or other pressure fluid can escape to the detriment of the boiler external fittings or risk of injury to workmen. For this purpose the feed screw mechanism shown in Fig. 1 comprises a nut in the form of an annular worm wheel 5 through which is threaded a sleeve 6 which is screw-threaded externally and located between a thrust washer 2a and a ball thrust bearing 2b at the front and rear ends respectively of a sleeve 2c in which is screwed or otherwise firmly fixed the blower tube 2. The screw-threaded sleeve 6 is provided with one or more longitudinal keyways or splines 2d which engage with fixed keys 7a in the housing 7. The worm wheel 5 is adapted to be operated by a worm 8 rotated directly by a hand wheel or by shaft and gearing from a remote control.

The inner end of the blower tube 2 and the sleeve 6 are supported concentrically about a fixed fluid pressure supply conduit 9 and together with the worm wheel and worm is accommodated within the housing 7 projecting from the nozzle housing chamber 3 secured in the boiler shell or the like. The conduit 9 is fixed and supported in a rear closure plate 9a sealing the rear end of the housing 7.

The advantage of the foregoing arrangement is the practically total enclosure of the feeding mechanism within the housing 7 and the fact that the sliding tubular assembly is firmly supported. Ease of operation is ensured by the ball thrust bearing 2b and also another 2e engaged by the annular face of the nut 5 remote from the end of the sleeve 6 engaged against the thrust bearing 2b, it being apparent that the bearing 2e takes the thrust of the screw-threaded sleeve 6 on the nut and its supporting means during movement of the blower tube, and the bearing 2b takes the axial thrust on such sleeve when the blower tube is turned or rotated. The thrust bearings are of noticeable advantage when operating soot blowers in which the steam or other pressure fluid passes as shown in the axial direction of the blower tube before entering the blower tube and in which, as described in my co-pending application No. 62,-972, a valve between the co-axial blower tube 2 and supply conduit 9 normally closes the latter, as it is apparent that a portion of the return movement of the blower tube must be effected against the pressure of the pressure fluid on the valve closed inner end of the blower tube.

The actual arrangement of valve mechanism shown by way of example is that described in my said co-pending application and comprises an annular seating member 10 against which is engaged one side of the head 11 of a mushroom valve, the valve spindle 12 being mounted and guided in the fluid pressure supply conduit 9 in such manner that the side of the valve head remote from the seating 10 is engaged against a further seating member 13 arranged in the supply conduit 9, the faces of the said co-acting members 10 and 13 being formed with raised annular ridges 14 over which are engaged lap coned or lipped parts 15 of the piston like valve head 11 thereby forming a closure to the fluid pressure supply conduit 9 when the apparatus is not in use, being preferably so formed to have a shrouding effect against erosion by the pressure fluid.

A suitable packing gland 16 is arranged at the end of the blower tube 2 remote from the nozzle to form a seal around the supply conduit 9 and in its forward movement the blower tube 2 is guided by a pin 17 projecting radially from the front end 7b of the blower tube housing chamber 7 into a shallow helical or other suitable channel cut into the blower tube, whereby the forward axial movement of the nozzle is accompanied by a simultaneous rotating movement. If the channel be straight then a simple longitudinal movement will result, or if desired it can be partly helical and partly straight.

The part of the housing accommodating the forward end of the blower tube is arranged as at 7c as a support or guide therefor, and this forward part of such housing is connected to a source of cooling medium so that cooling air can pass around the nozzle via inlet 21 on boss 22 through arcuate parts 21a in housing 7b.

In operation the rotation of the worm 8 and worm wheel 5 by means of the handwheel or remote control system causes the advancement of the blower tube, the valve however remaining closed on its seating 10 by reason of the force exerted by the pressure supply fluid against the piston like head 11 of the valve. Continued movement of the nozzle tube however, brings an abutment 12a on the tail end of the valve rod 12 against a stop formed by a valve guide collar 13a formed concentrically in the annular seating member 13, radial webs joining the members 13 and 13a, the spacing of which allows free passage of pressure fluid therethrough. The valve seating 10 in the blower tube upon continued movement of the nozzle tube is then caused to move away from the valve allowing the passage of the pressure fluid from behind the piston head via a number of small radial passages 11a in the periphery of the valve head and from thence into the nozzle 1 the mouth of which may as shown be radially directed to obtain a wide sweeping effect.

Due to the inductive effect of the steam or air issuing from the nozzle, the valve 11 will always be maintained in a forward position until retracted by the reverse operation of the worm 8 and worm wheel 5.

The worm wheel may be mounted upon suitable bearings or as shown upon plain annular bosses 19 in the nozzle tube housing which may also be provided with channels or ports to drain off condensation of the steam or air supply.

Figure 2:
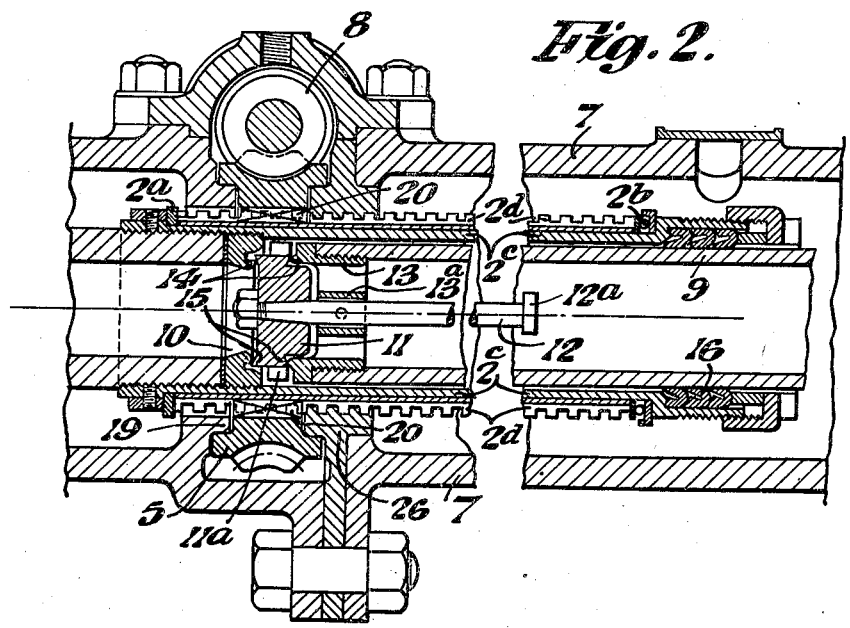
Fig. 2 is a longitudinal section showing a worm and nut device actuating a rotatable and slidable threaded sleeve traversing device.
Figure 3:
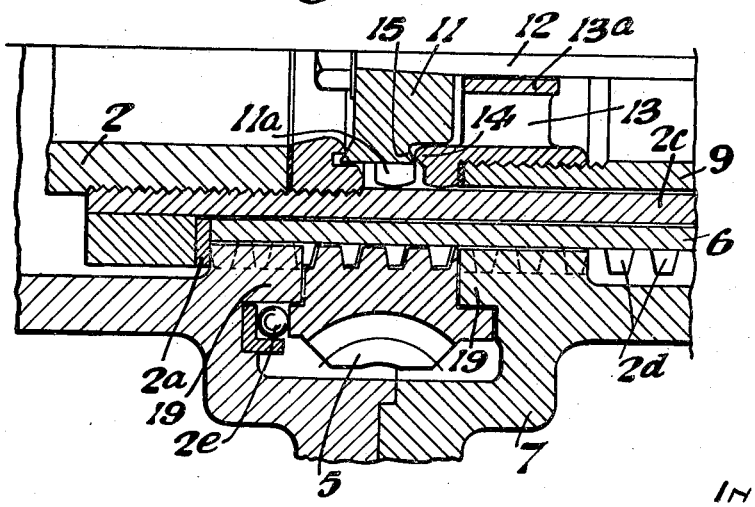
Fig. 3 is a detail sectional elevation showing the arrangement of thrust bearing with the nut in Fig. 1.

The foregoing construction and operation of the valve 11 is also adopted with the device shown in Fig. 2 which however employs a modified mechanism for advancing and rotating the blower tube 2. In common with the arrangement shown in Fig. 1 the casing 7 is arranged in two sections the forward one of which is provided with a suitable flange 7d between its ends by which it may be clamped to a suitable wall box, i. e., the hollow chamber 3, in the boiler or other casing. The nozzle 1 which is mounted at the end of a suitable tube 2 is as shown normally located within this chamber 3.

In the said alternative method shown in Fig. 2 of imparting the axial movement to the nozzle the worm wheel 5 instead of forming a nut engaging with the screw-thread on the extended portion of the tubular nozzle carrying member is splined or keyed on the sleeve 6 as at 20. The axial feeding of the sleeve 6 is effected by locating a fixed nut 26 in the housing 7 preferably, as shown, close to the worm wheel 5. In this arrangement, if desired, the forward thrust washer 2a may be replaced by a ball thrust bearing. As will be seen this arrangement obviates the necessity of the ball thrust bearing 2e for the worm wheel 5. It will be appreciated that in this arrangement the rotation of the threaded sleeve 6, which can be described as a thrust member, does not affect the question of preventing or providing rotary movement of the blower tube which is free to be adapted for rotation relatively to the sleeve 6 or non-rotation.

By means of the present invention operating mechanism for soot blowers and the like is provided which to a certain extent is universal in its application to blower tubes adapted for rotation during all or part of its sliding movement, or for non-rotary sliding movement.

I claim:

1. In a soot blower in which a blower tube is advanced and retracted relatively to a housing, operating mechanism comprising a stationary housing, a blower tube and a tubular threaded member in said housing, connected together for sliding movement in unison in the housing, said threaded member being loose about said blower tube, thrust bearings between the ends of said threaded member and abutments on the blower tube, a stationary pressure fluid supply conduit extending into said blower tube, packing between the blower tube and said conduit, a valve seating at the front end of said conduit and an opposed seating within the blower tube, an axially slidable valve between said seatings, a rotary driving member inside the housing having driving connection with said threaded member to advance and retract the blower tube.

2. A soot blower comprising a tubular housing, a fixed pressure fluid supply conduit extending into one end of the housing, the housing being sealed at said end against escape of pressure fluid, a sleeve in the housing sealed about and slidable along the supply conduit, a blower tube fixed at its rear end in the front end of said sleeve, driving mechanism within the housing to advance and retract the blower tube and said sleeve, an annular valve seating at the rear end of the blower tube and an opposed annular valve seating at the front end of said supply conduit, and a poppet valve in said conduit and with its head interposed between and adapted to be pressed against said seating when the blower tube is retracted, said driving mechanism comprising a driven gear ring within the housing and a threaded collar about said sleeve fixed to the blower tube and thrust bearings between the ends of the said sleeve and abutments.

JOHN WILLIAM LESLIE SIMPSON.